United States Patent [19]

Iijima

[11] Patent Number: 5,517,014
[45] Date of Patent: May 14, 1996

[54] FILE MANAGEMENT APPARATUS FOR IC CARD

[75] Inventor: Yasuo Iijima, Yokohama, Japan

[73] Assignee: Kabushiki Kaisha Toshiba, Kawasaki, Japan

[21] Appl. No.: 215,574

[22] Filed: Mar. 22, 1994

[30]     Foreign Application Priority Data

Mar. 24, 1993  [JP]  Japan .................................. 5-064503

[51] Int. Cl.$^6$ ................................................... G06K 19/06
[52] U.S. Cl. ........................ 235/492; 235/487; 395/600; 902/1; 902/4; 902/26
[58] Field of Search ................................. 235/492, 487; 902/4, 1, 26; 395/600

[56]             References Cited

U.S. PATENT DOCUMENTS

| 4,734,568 | 3/1988 | Watanabe | 235/380 X |
| 4,829,169 | 5/1989 | Watanabe | 235/492 |
| 4,928,001 | 5/1990 | Masada | 235/380 |
| 4,930,129 | 5/1990 | Takahira | 331/40.4 |
| 5,097,118 | 3/1992 | Iijima | 235/492 |

FOREIGN PATENT DOCUMENTS

| 0262025 | 3/1988 | European Pat. Off. | |
| 4126213 | 2/1993 | Germany | 235/492 |

Primary Examiner—Donald T. Hajec
Assistant Examiner—Jeffrey R. Filipek
Attorney, Agent, or Firm—Cushman, Darby & Cushman

[57]            ABSTRACT

A file management apparatus capable of inhibiting an accessing operation for a plurality of areas within files. The file management apparatus includes a memory storing files each having multiple areas, a first storage unit for storing lock data denoting a locking condition of an accessing operation for each of the files, a determination device for determining whether the accessing operation for areas to be accessed is inhibited by referring to the lock data for the files, and an accessing device for accessing a particular one of the areas when the determination means determines that access to the group of areas containing that particular area is not inhibited. The file management apparatus also determines the inhibited/non-inhibited status for data areas within each file based on lock data and key data corresponding to each of those data areas.

5 Claims, 8 Drawing Sheets

| PTN | DFSN | PFSN | NL | DF name | DFS | DFAC | DFST | BCC |

FIG. 5A

| PTN | DFSN | AID | ATOP | ASIZ | AAC | AST | BCC |

FIG. 5B

| PTN | DFSN | KID | KTOP | KSIZ | BS | KAC | KST | BCC |

FIG. 5C

|     | DFSN |                             |
|-----|------|-----------------------------|
| #1  | 01   | DF 1 DEFINITION WORD (00)   |
| #2  | 01   | KEY AREA 1 DEFINITION WORD  |
| #3  | 01   | DATA AREA DEFINITION WORD   |
| #4  | 02   | DF 2 DEFINITION WORD (00)   |
| #5  | 02   | KEY AREA 2 DEFINITION WORD  |
| #6  | 01   | KEY AREA 3 DEFINITION WORD  |
| #7  | 00   | KEY AREA 4 DEFINITION WORD  |
| #8  | 03   | DF 3 DEFINITION WORD (02)   |
| #9  | 03   | KEY AREA 5 DEFINITION WORD  |
| #10 | 04   | DF 4 DEFINITION WORD (02)   |
| #11 | 04   | KEY AREA 6 DEFINITION WORD  |
| #12 | 01   | DATA AREA 2 DEFINITION WORD |

FIG. 4

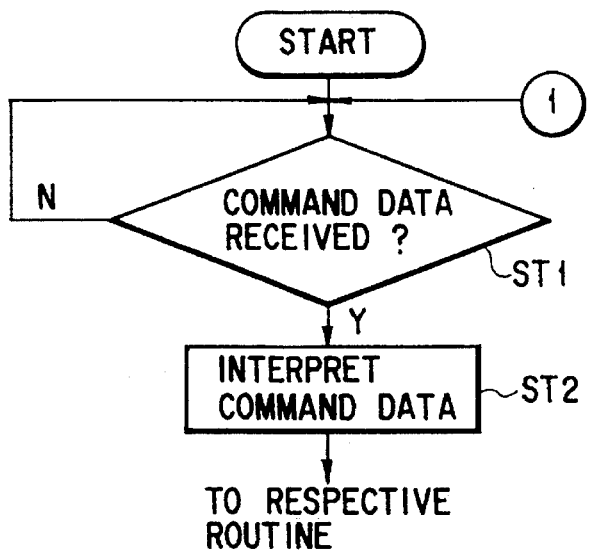

FIG. 6

— CONDITIONED KEY CHANGING ACCESS
— CONDITIONED KEY REFERENCE ACCESS
— CONDITION-FREE KEY CHANGING ACCESS
— CONDITION-FREE KEY REFERENCE ACCESS

— CONDITIONED DATA CHANGING ACCESS
— CONDITIONED DATA REFERENCE ACCESS
— CONDITION-FREE DATA CHANGING ACCESS
— CONDITION-FREE DATA REFERENCE ACCESS

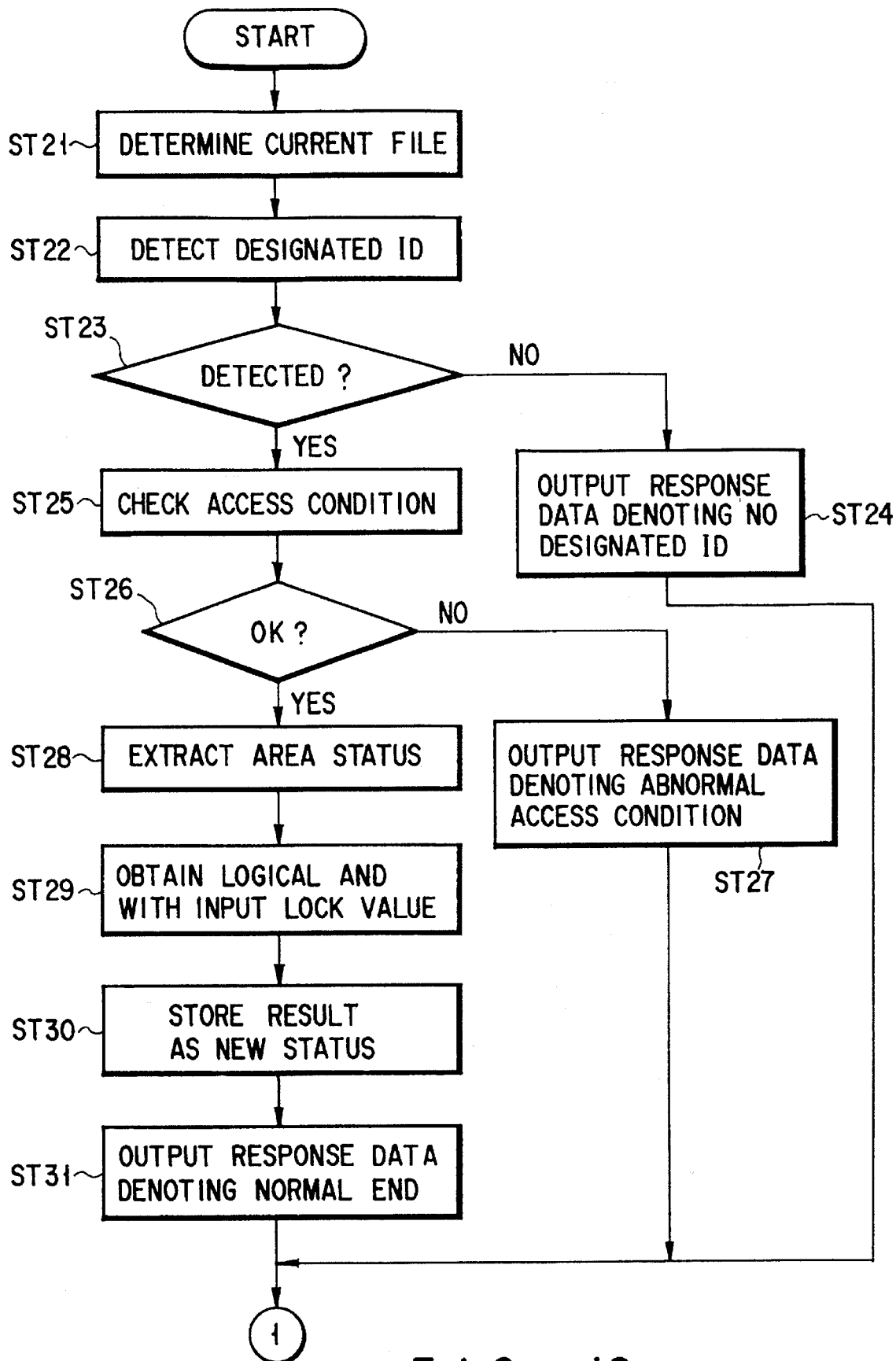
F I G. 12

FILE MANAGEMENT APPARATUS FOR IC CARD

BACKGROUND OF THE INVENTION

1. Field of the Invention

The present invention relates to a file management apparatus for an IC card incorporating an IC chip having a nonvolatile memory and a control element such as a CPU for controlling the nonvolatile memory, which apparatus serves to manage a plurality of files separately set in the memory.

2. Description of the Related Art

In recent years, as a portable data storage medium, an IC card incorporating an IC chip having a nonvolatile memory and a control element such as a CPU for controlling the memory has received a great deal of attraction.

The IC card of this type is known in U.S. Pat. No. 4,985,615 having a memory whose memory area is divided in correspondence with a plurality of files. In each file, data or the like required for performing a corresponding application is stored. When an application identification name is input from a terminal device in which the IC card is inserted, the IC card can be set in a state in which only a corresponding file can be selectively used. In this manner, when a plurality of application data are divided and stored into files provided in one IC card, the IC card can be multi-purposely utilized.

In some application, a specific IC card must be inhibited from being used by the user of this IC card. For example, in a credit application, when a card user is written on a black list, the use of this card by the user must be inhibited in the credit application.

When the method described above is used, with an increase in the number of users written on the black list, the amount of operation performed to check IC cards increases. In particular, when this application is employed world-wide scale, a black list to be referred to becomes enormous so that the amount of operations required to check IC cards conspicuously increases.

For this reason, the following method is considered. That is, in each IC card, access to a file corresponding to an application whose use must be limited is forcibly inhibited to make reference of the black list unnecessary.

SUMMARY OF THE INVENTION

It is an object of the present invention to provide a file management apparatus for an IC card, in which an enormous black list used in the execution of an application need not be referred to, and the flexibility of file management of the application is improved.

According to an aspect of the present invention, there is provided a file management apparatus in which a memory is divided into a plurality of files, and the divided files are managed such that the files are arranged to have a so-called tree structure constituted by upper and lower files, comprising: first access limiting means for limiting access to one lower file of lower files belonging to a designated upper file, second access limiting means for limiting access to a set of a plurality of specific lower files of the lower files belonging to the designated upper file, and selecting means for selecting the first access limiting means and the second access limiting means.

According to another aspect of the present invention, there can be provided a file management system in which a memory is divided into a plurality of files, and the divided files are managed such that the files are arranged to have a so-called tree structure constituted by upper and lower files, comprising first access limiting means for limiting access to one lower file of lower files belonging to a designated upper file, first access relaxing means for relaxing an access limitation performed by the first access limiting means, second access limiting means for limiting access to a set of a plurality of specific lower files of the lower files belonging to the designated upper file, second access relaxing means for relaxing an access limitation performed by the second access limiting means, and selecting means for selecting the first access limiting means, the second access limiting means, the first access relaxing means, and the second access relaxing means.

According to the present invention, the use of one file or a plurality of files corresponding to a specific application and included in an IC card can be forcibly inhibited by instruction data externally input to the IC card. Therefore, an enormous black list need not be referred to when the application is performed. One lower file belonging to an upper file or a set of a plurality of specific lower files can be selected as an object to which use inhibition processing is performed. Therefore, the flexibility of file management for applications is improved. In addition, when the use inhibition processing is released, the corresponding application can be set to be used by the user again.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is a view showing an arrangement of a directory set in the data memory;

FIGS. 5A to 5C are views respectively showing formats of pieces of various definition information;

FIG. 6 is a flow chart for explaining an instruction data input routine;

FIG. 12 is a flow chart for explaining an area lock instruction routine;

DETAILED DESCRIPTION OF THE PREFERRED EMBODIMENTS

An embodiment of the present invention will be described below with reference to the accompanying drawings.

Figure 1:
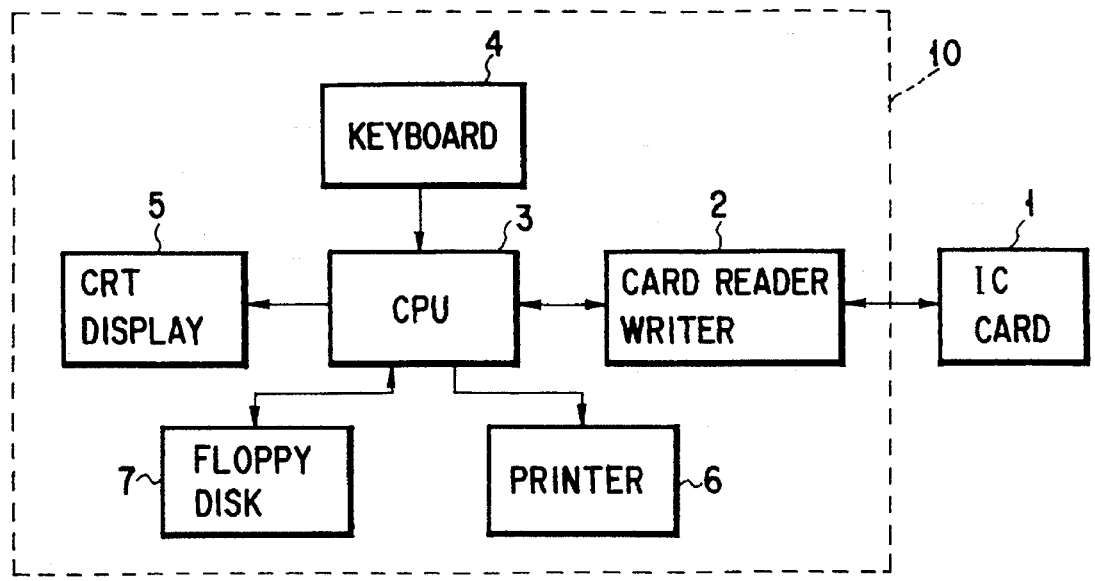
FIG. 1 is a block diagram showing the arrangement of a card processing device to which an IC card according to an embodiment of the present invention is applied.

FIG. 1 is a block diagram showing an arrangement of a card processing device 10 to which an IC card 1 serving as a portable electronic device according to this embodiment. The device 10 is used as a terminal device of a financial system, a shopping system, or the like. This card processing device 10 is constituted such that an IC card 1 can be connected to a control unit, e.g., a CPU 3 of the device 10, through a card reader/writer 2, and a keyboard 4, a CRT display device 5, a printer 6, and a floppy disk device 7 are connected to the CPU 3.

Figure 2:
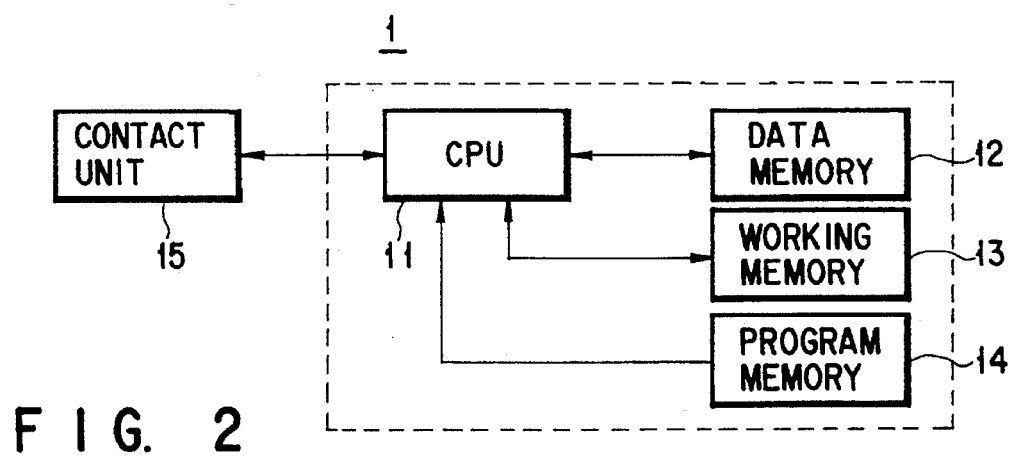
FIG. 2 is a block diagram showing an arrangement of the IC card.

FIG. 2 shows the arrangement of an IC card 1. The IC card 1 is constituted by a CPU 11 serving as a control unit, a nonvolatile data memory 12 whose stored contents can be erased, a working memory 13, a program memory 14, and a contact unit 15 for obtaining electrical contact with the card reader/writer 2 of the device 10. Of these constituent elements, the elements (the CPU 11, the data memory 12, the working memory 13, and the program memory 14) surrounded by a dashed line in FIG. 2 are constituted by one chip and mounted in the IC card main body. The CPU 11, the data memory 12, the working memory 13, and the keyboard 4 may be constituted by a plurality of IC chips.

The data memory 12 is used to store various data, and is constituted by, e.g., an EEPROM or the like. The working memory 13 is a memory for temporarily storing processing data used when the CPU 11 performs data processing, and the working memory 13 is constituted by, e.g., a RAM or the like. The program memory 14 is constituted by, e.g., a mask ROM, and stores a program of the CPU 11 or the like.

Figure 3:
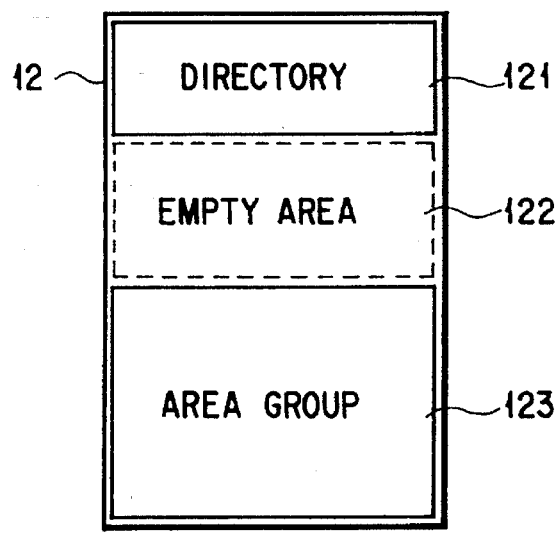
FIG. 3 is a memory map showing an arrangement of a data memory.

For example, as shown in FIG. 3, the data memory 12 is divided into a directory area 121, an empty area 122, and an area group 123. The area group 123 has a plurality of data areas and a key area and can be grouped by a concept called a data file. That is, the data file is a file for simultaneously managing the data areas and the key areas used in a corresponding application.

A data area is an area for storing data such as transaction data which is read and written as needed.

These pieces of various definition information are stored in the directory 121 en bloc as shown in FIGS. 5A–5C. As shown in FIG. 4, the DFSNs (file serial numbers) are automatically given to definition words, respectively, when the files are formed. In this case the files are arranged to have a so-called hierarchical structure. The CPU 11 recognizes the relationships between the files on the basis of the DFSNs and parent file serial numbers stored in the data file definition words.

For example, since a key area defined by a key area 3 definition word stored sixth (#6) has a DFSN of "01", it is understood that the key area belongs to a parent file, DF1 (data file 1).

A key area 6 definition word stored eleventh (#11) is belonging to a DF4 as described above, and this DF4 has a DFSN of "02". For this reason, it is understood that the key area 6 is belonging to a DF2.

A key area is an area used for storing, e.g., a password or the like, and is subjected to write/rewrite/collate operations. The contents of the key area cannot be read out of the IC card 1.

The control element (CPU) 11 recognizes the physical positions or the like of these files and areas by the directory 121 in the data memory 12. In order to recognize the physical positions or the like, as shown in FIGS. 5A to 5C, pieces of various definition information (to be described later) corresponding to the files and areas are stored.

FIG. 5A shows information for defining one data file. This definition information is constituted by data PTN for identifying data file definition information in the directory 121, a data file serial number DFSN assigned to this data file, a parent file serial number PFSN which is an upper file of this data file, a data file name DFN given to this data file, a name length NL representing the length of the data file name, a data file size DFS, a data file access condition DFAC representing the access condition of the data file, a data file status DFST for holding the status of the file, and bit check code data BBC for checking the validity of all the data.

The DFST shown in FIG. 5A has a data file lock value which will be described in detail later by referring to FIG. 9.

Figure 9:
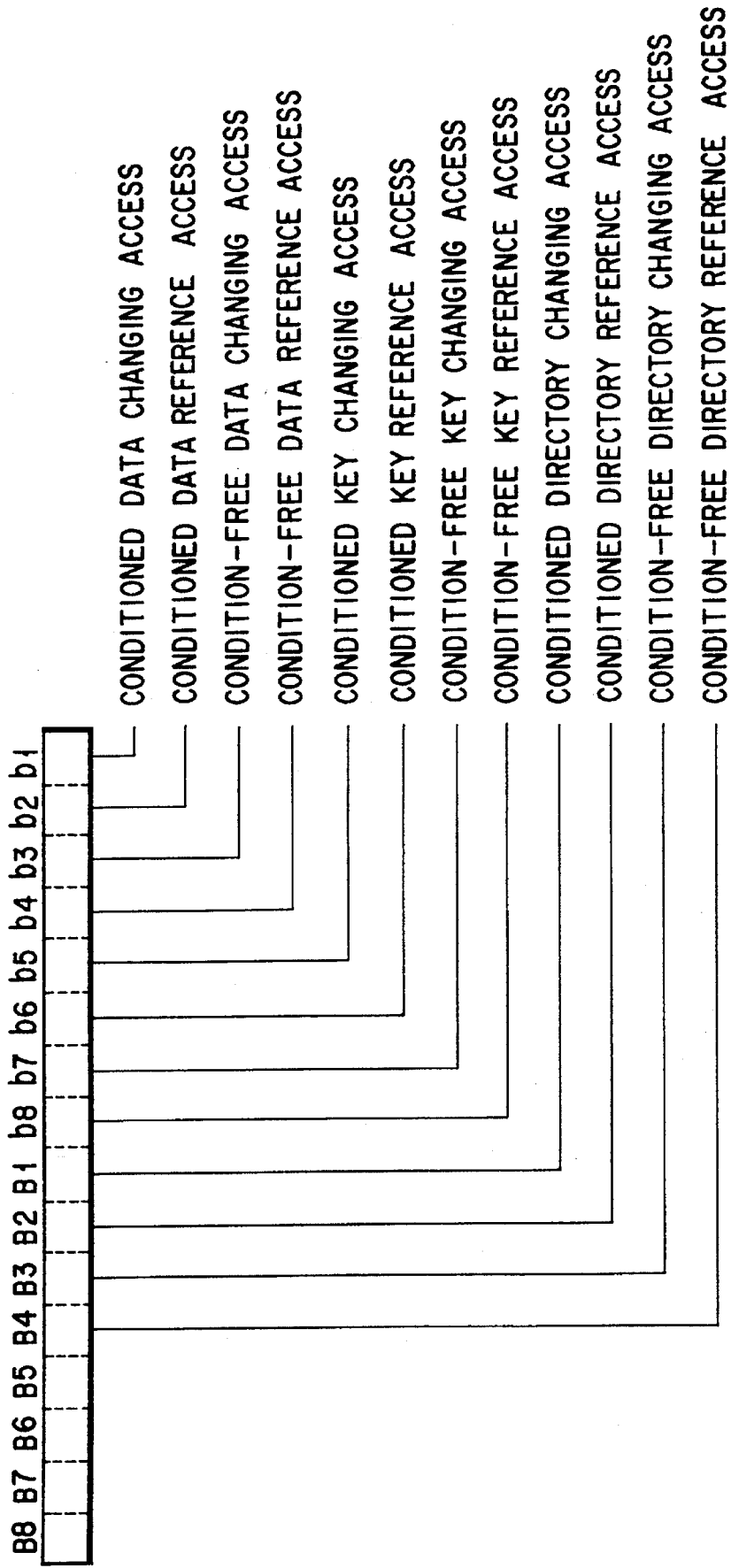
FIG. 9 is a view showing a format of a data file lock value.

This lock value has a 2-byte format shown in FIG. 9, and different lock functions are assigned to the bits of the lock value. As shown in FIG. 9, lower two bits B1 and B2 of the first byte of the two bytes represent lock functions related to access to a data file, respectively, and subsequent two bits B3 and B4 represent lock functions related to free access to the data file, respectively.

More specifically, the meanings of the bits of the first byte are defined as follows. That is, a lowermost bit B1 designates, when an access condition is set in directory change access (e.g., a new area is additionally set in the file) to the data file, whether this access is inhibited. A second bit B2 designates, when an access condition is set in directory reference access to the data file, designates whether this access is inhibited. A third bit B3 designates, when a free condition (access can be performed regardless of a result obtained by checking whether a key is collated) is set in directory change access to the data file, whether this access is inhibited. A fourth bit B4 designates, when a free condition is set in the directory reference access to the data file, whether this access is inhibited.

Bits b7 and b5 of the first byte of the lock value represent lock functions related to change access to a key area belonging to the corresponding data file, and bits b8 and b6 represent lock functions related to reference access to the key area belonging to the data file.

The meanings of these bits are defined as follows. That is, the bit b5 designates, when an access condition is set in key change access (key setting/changing or the like) to the key area, whether this access is inhibited. The bit b6 designates, when an access condition is set in access for referring to a key state, designates whether this access is inhibited. The bit b7 designates, when a free condition is set in the key change access to the key area, whether this access is inhibited. The bit b8 designates, when a free condition is set in the access for referring to the key state, whether this access is inhibited.

Lower four bits b4 to b1 of the second byte of the lock value are related to lock functions related to access to the data area belonging to the corresponding data file.

The meanings of these bits are defined as follows. That is, the lowermost bit b1 designates, when an access condition is set in stored data change access (write/rewrite/erase access or the like for data) to the data area, whether this access is inhibited. The second bit b2 designates, when an access condition is set in stored data reference access (read access or the like for data) to data area, designates whether this access is inhibited. The third bit b3 designates, when a free condition is set in the stored data change access to the data area, whether this access is inhibited. The fourth bit b4 designates, when a free condition is set in the stored data reference access to the data area, whether this access is inhibited.

With regard to each bit, "1" means that access can be performed, and "0" means that access is inhibited.

FIG. 5B shows information for defining an area for various transaction data or the like. This definition information is constituted by data PTN for identifying area definition information in the directory 121, a data file serial number DFSN of data file to which this area belongs, an area identification number AID used when access to the area is performed, an area top address ATOP representing the top address of the area, an area size ASIZ representing an area size, an area access condition AAC representing the access condition of the area, an area status AST holding the status of the area, and the bit check code data BCC for checking the validity of all the data. The AST shown in FIG. 5B has an area lock value which will be described in detail later by referring to FIG. 11.

Figure 11:
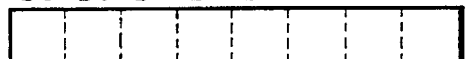
FIG. 11 is a view showing a format of a data area lock value.

In each data area definition information, as shown in FIG. 11, lower 4 bits b1 to b4 have a lock value inherent in the data area in the same format as that of the lower 4 bits b1 to b4 of the second byte of the lock value in the data file definition information described above.

Figure 14:
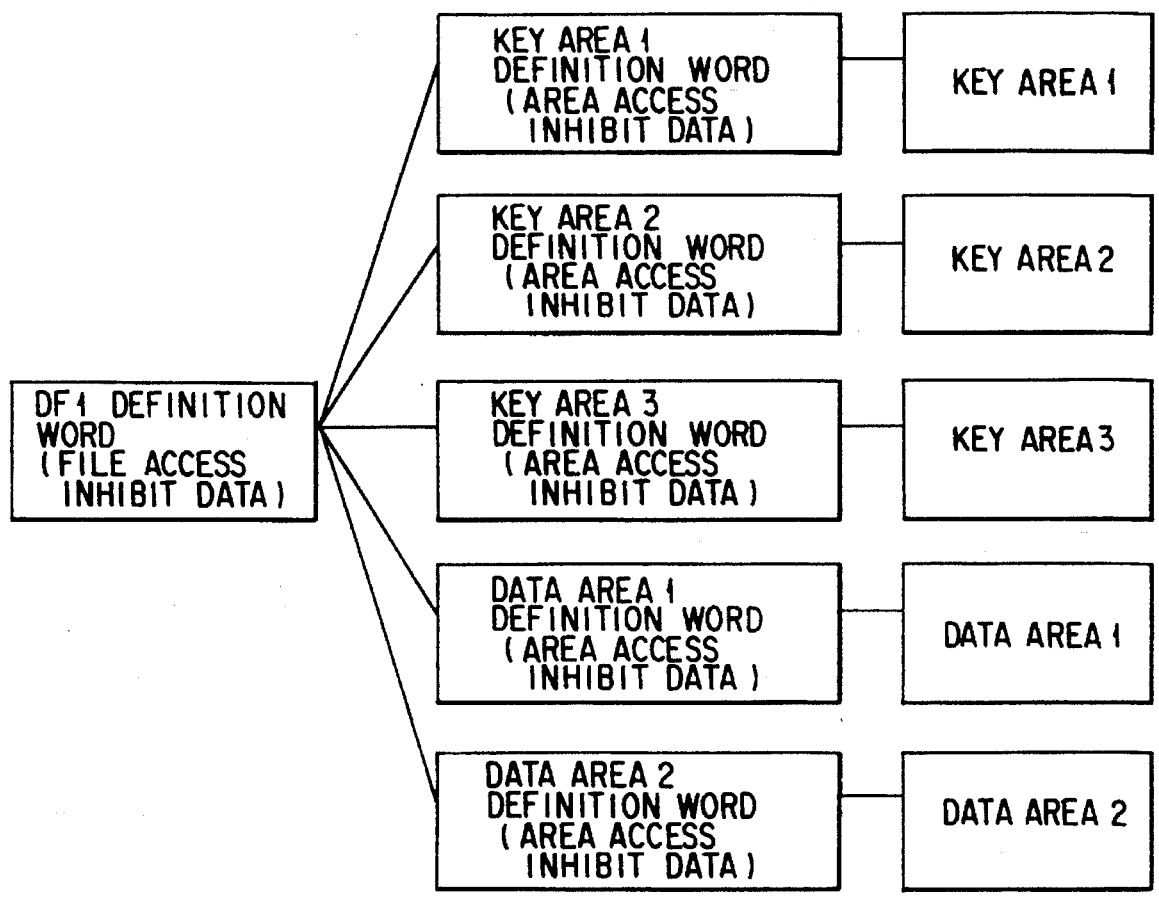
FIG. 14 shows a relationship between file access inhibition information and area access inhibition information.

The relationship between the data file definition word and the key or data area definition word for defining key areas or data areas will now be described by referring to FIG. 14. As shown in FIG. 14, a key area 1 definition word shown in #2 of FIG. 4, a key area 2 definition word shown at #5, a key area 3 definition word shown at #6, a data area 1 definition word shown at #3, and a data area 2 definition word shown at #12 are defined to depend on the data file 1 definition word as shown in FIG. 14. The key area definition words are used to define the key area 1, key area 3 and key area 3, respectively, and data area definition words are used to define the data area 1 and data area 2, respectively. As can be understood from FIG. 14, the DF1 definition word includes file access inhibit information for inhibiting the access to the respective area definition words which include area access inhibit information for inhibiting the access to the respective key areas or data areas. Thus, the DF1 definition word can inhibit commonly the access to the respective areas in DF1.

FIG. 5C shows information for defining an area for stage various key data. This definition information is constituted by data PTN for identifying key area definition information in the directory 121, a serial number DFSN of a data file to which this area belongs, an identification number KID (key identification data) used to access to the area, a KTOP (key area top address) representing the top address of the area, a KSIZ (key area size) representing an area size, a KAC (key area access condition) representing the access condition of a key, a KST (area status) holding the status of the area, and data BCC for checking the validity of all the data. The KST shown in FIG. 5C has a key area lock value which will be described in detail later by referring to FIG. 10.

Figure 10:
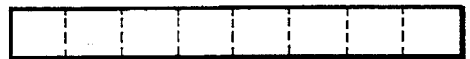
FIG. 10 is a view showing a format of a key area lock value.

In each key area definition information, as shown in FIG. 10, lower 4 bits b1 to b4 have a lock value inherent in the key area in the same format as that of the upper 4 bits b5 to b8 of the second byte of the lock value in the data file definition information of FIG. 9.

In each file, information for designating a key required to access to the corresponding file is defined. These pieces of information can be independently set in units of access types as described below.

The data files have access types related to a forcible lock operation representing inhibition of access to a file, a registering operation of an area into a file, a reference operation of directory information, and a lock releasing operation representing access release of the file.

The data areas have access types related to a reference operation of data, a write operation of data, a rewrite operation of data, and an erasing operation of data.

The key areas have access types related to a write operation of key data, a rewriting operation of key data, an unlock operation of key data, and a lock operation of key data.

These pieces of access condition information specify a combination of keys present in the IC card 1 and constituted by, e.g., 4 bytes. These bytes respectively correspond to the access types, and a key having a BS (Bit for Setting the assignment of collation flag) corresponding to the position of a bit set in each byte is requested in access. Note that, when all the bits are reset, the collation states of the keys need not be checked (free access) in access corresponding to the reset bits.

A field for holding data indicating that a specific key is collated is arranged at a predetermined position of the working memory 13. In this field, a bit designated by a BS which this key has is set/reset in response to a key reference operation. Therefore, when an access command is input from the external device 10 with respect to each file or each area, the CPU 11 determines a specific one of the access types described above and extracts a byte representing an access condition corresponding to this access type. The CPU 11 checks whether a reference state requested by each bit of this byte coincides with a reference state on the working memory 13, thereby determining whether the access can be performed.

For example, when an access condition for reading data from a data area is a key A in the IC card 1, the CPU 11 checks whether this access condition is satisfied when a data read instruction for this data area is externally input to the CPU 11. If the reference status of the key A is not set, it is understood that the data area cannot be accessed.

These examinations are performed in not only read access but also another access such as write access in the same manner as described above. When instructions for a key area and a data file are input, as described above, corresponding access conditions and key reference statuses obtained at this time are confirmed.

In the IC card 1 in which the above access control is performed, inhibition of access to a data file, i.e., a lock function, will be described below.

As shown in FIG. 6, when the IC card 1 is inserted into the terminal device 10 shown in FIG. 1 to connect the contact unit 15 to the card reader/writer 2, the power supply terminal and data terminal of the contact unit 15 are connected to each other, thereby performing initialization such as a power supply operation and reset operation, i.e., electrical activation of the IC card 1. After this electrical activation is performed, the IC card 1 is set in a wait state for externally input command data. At this time, the IC card 1 continuously waits for the command data in step ST1. When the command data is input to the IC card 1, the flow advances to step ST2 to extract and interpret a function code at the top of the command data. Thereafter, the flow advances to a command routine corresponding to the interpreted result, processing is performed in the command routine, a result obtained by this processing is output, and is set in the command data wait state is set again.

Figure 7A:
FIGS. 7A to 7E are views respectively showing formats of various instruction data.

In this state, if the inserted IC card 1 is subjected to use inhibition processing in this application, a data file lock command shown in FIG. 7A is input from the terminal device 10 to the IC card 1. As a result, the operation mode is changed from the operation mode shown in FIG. 6 to the data file lock command routine shown in FIG. 8.

Figure 7E:
Figure 8:
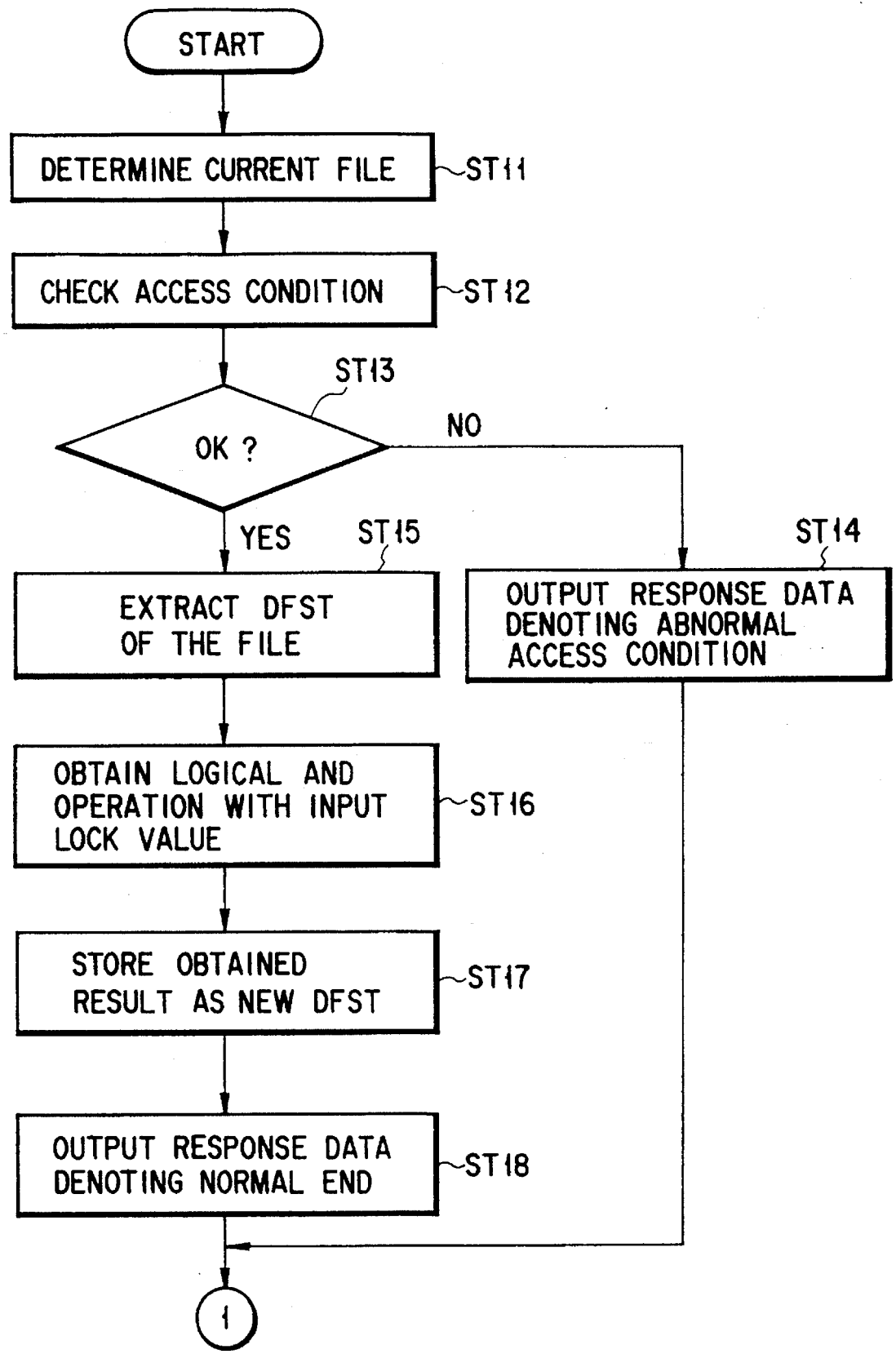
FIG. 8 is a flow chart for explaining a data file lock instruction routine.

That is, the CPU 11 identifies a data file currently set in a current state in step ST11 of FIG. 8. For this purpose, file selection command data shown in FIG. 7E and constituted by a data file selection function code, a date length LEN, and a data file name is input to the CPU 11. In this case, the CPU 11 searches the directory 121 for a data file having the same file name as the data file name input by the file selection command data. If the CPU 11 finds the data file, a corresponding DFSN is held at a predetermined position of the working memory 13. If the CPU 11 find no data file, the information at the predetermined position is not changed. Note that, after the IC card 1 is electrically activated, this information is set to be "00".

When the data file set in a current state is found, the CPU 11, in step ST12, extracts an access condition related to the data file lock described above from access conditions corresponding to the data file, and compares the extracted access condition with the above key reference state to check whether this command is executed. If NO in step ST13, the flow advances to step ST14 to output response data representing access condition abnormality and returns to step ST1 of FIG. 6 in which the command data wait state is set.

If YES in step ST13, the CPU 11 extracts status information corresponding to the data file in step ST15, and, in step ST16, the CPU 11 calculates a logical AND between the status information and a lock value defined next to data file lock function code data designated by the command data shown in FIG. 7A.

The CPU 11 compares the lock value input by a lock instruction in step ST16 with the status of the data file set in a current state, calculates a logical AND (AND) therebetween in units of bits, and stores the obtained result at a predetermined position of data file definition information as a new data file status, i.e., a lock value, in step ST17. Note that, at this time, validity check data BBC is calculated again, and new data BCC is written. Response data indicating normal processing is output in step ST18, and the flow returns to step ST1 of FIG. 6 in which the command data wait state is set.

These lock processing operations are performed for the key area and data area belonging to the current data file.

Figure 7B:

At this time, the area lock command data shown in FIG. 7B including ID (identification information) is given to the key area and data area together with the area lock function code and the lock value. When the CPU 11 receives this command data, as shown in FIG. 12, the CPU 11 recognizes the current file in step ST21. In step 22, the CPU 11 checks by referring to the directory 121 in FIG. 3 whether the designated ID is present in an area belonging to the current data file. If the ID is not found, the flow advances from step ST23 to step ST24 to output response data representing that no designated ID is present, and returns to step ST1 in which the command data wait state is set. If YES in step ST23, the flow advances to step ST25 to refer to an access condition corresponding to lock processing designated in a designated area, thereby checking whether access can be performed. If it is determined that the access cannot be performed, the flow advances from step ST26 to step ST27 to output response data representing access condition abnormality, and returns to step ST1 in which the command data wait state i set.

If it is determined that the access can be performed, area status information corresponding to the corresponding data file is extracted in step ST28, and this area status information is compared with the lock value designated by the command data. The CPU 11 calculates a logical AND (AND) between a lock value input by a lock instruction in step ST29 and the data file set in a current state, and stores the obtained result at a predetermined position of data file definition information as a new lock value in step ST30. Note that, at this time, BBC is calculated again, and new BCC is written. In step ST31, response data indicating processing normal end is output, and the flow returns to step ST1 in which the command data wait state is set.

Figure 13:
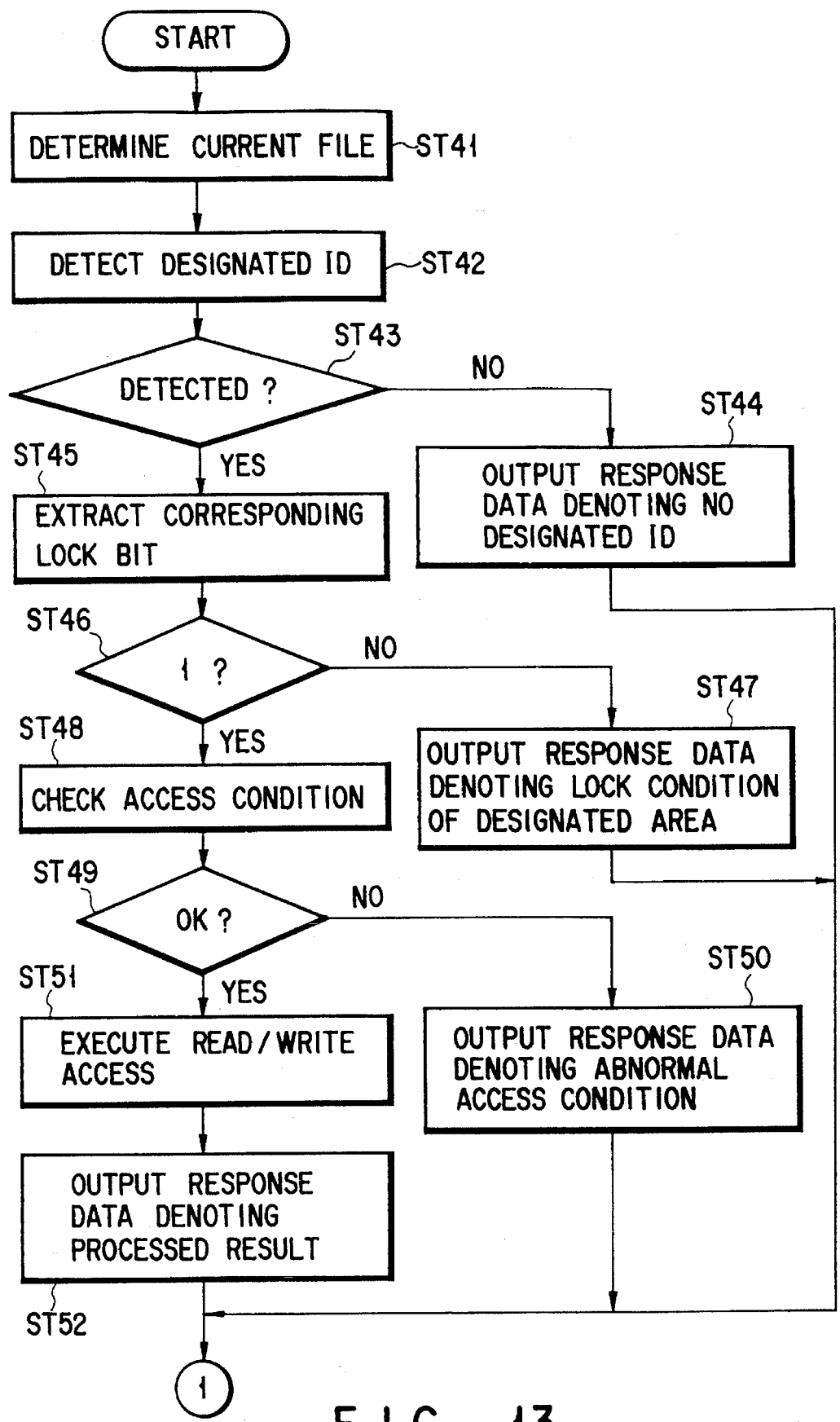
FIG. 13 is a flow chart for explaining a data area access instruction routine.

The relationship between an access condition and a lock value will be described below using data read access to a data area as an example with reference to the flow chart shown in FIG. 13.

Figure 7C:
Figure 7D:
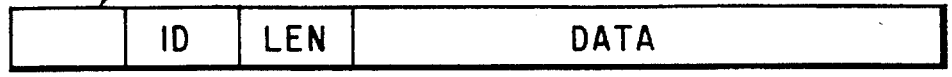

When the IC card 1 is set in an command data wait state in step ST1 of FIG. 6, and access command data, (e.g., FIG. 7C or 7D) for read/write area data is input to the IC card 1, the CPU 11 recognizes a current file in step ST41 as in the operation shown in FIG. 8. In step ST42, the CPU 11 searches pieces of data area definition information which belong to the current data file for definition information having ID designated by command data. At this time, if a corresponding ID is not found, the flow advances from step ST43 to step ST44 to output response data indicating that no ID is present, and returns to the step ST1 in which the command data wait state is set.

If the ID is found, the flow advances to step ST45 to extract a lock bit representing, of access conditions set in this definition information, an access condition related to the type of the designated access.

For example, when this access is data read access, an access condition corresponding to the data read access is extracted in step ST46. When this access condition represents a free access condition, the CPU 11 refers to the fourth bit b4 of the lower 4 bits of the second byte of the lock value of the current data file in FIG. 9 and the fourth bit b4 of the lock value of the corresponding data area. In this case, when both the bits are set to be "1", the flow advances to step ST48 in which access processing is performed. When any one of the bits is "0", the flow advances to step ST47 to output response data indicating that the data area is locked, and the returns to the step ST1 in which the command wait state is set.

When the access condition requests collation of a key, the CPU 11 refers to the sixth bit b6 of the second byte of the lock value of the current data file in FIG. 9 and the second bit b2 of the lock value of the corresponding data area in FIG. 10. When any one of the two bits is set to be "0", the CPU 11 outputs response data indicating that the area to be accessed is locked, and the flow returns to step ST1 in which the command data wait state is set. When both the bits are set to be "1", it is checked in step ST49 whether the key designated by the access condition is collated. If NO in step ST49, the CPU 11 outputs response data indicating access condition abnormality in step ST50, and the flow returns to step ST1 in which the command data wait state is set. If YES in step ST49, the flow advances to step ST51 in which read/write access processing is performed.

Note that, when the access processing is performed in step ST51, an area to be accessed is recognized by the top address and size of the data area set in the corresponding data area definition information. The CPU 11 outputs response data representing the processing result, and the flow returns to step ST1 in which the command data wait state is set.

In this manner, when data write/rewrite/erase access to a data area is to be performed, whether the access can be performed is checked using corresponding access conditions, the corresponding bits of the lock value of the data file, and the corresponding bits of the lock value of the data area to be accessed.

When access to the key area is to be performed, whether the access can be performed is checked using corresponding access conditions (set in definition information of the key area to be accessed), the corresponding bits of the lock value of the data file, and the corresponding bits of the lock value of the key area to be accessed.

When access to the data file is to be performed, whether the access can be performed is checked using access conditions (set in definition information of the data file to be accessed) corresponding to the access, the corresponding bits of the lock value of the corresponding data file.

In the embodiment described above, in checking whether access can be performed, when the access cannot be performed due to the lock value, response data representing that an object to be accessed is locked is output. However, this response data may be replaced with response data representing access condition abnormality.

In the embodiment, although the bits of a lock value can be independently set, when the bits are to be locked, bit values representing access inhibition may be sequentially set in the lowermost bit to the upper bits; when the bits are to be unlocked, bit values representing access permission may be set from the uppermost bit to the lower bits. In this case, when the set lock value is compared with the input set value to check whether a change in the set value is proper. If the change is not proper, response data representing lock value abnormality, the flow returns to step ST1 in which the command data wait state is set.

In the above embodiment, although 4-bit value is assigned as the lock value, the number of bits can be changed depending on the types of a corresponding command and the conditions of bits to be locked.

In the embodiment, command data corresponding to only an lock instruction and a corresponding flow are described. However, when a logical OR (OR) between the input lock value and the set lock value is calculated in place of the logical AND (AND) therebetween, the present invention can easily cope with command data for changing a lock value.

Although a contact unit is used to perform transmission/ reception of data between an IC card and an external device, a method of performing transmission/reception of data in a noncontact state with respect to the external device by using light, an electric field, or a magnetic field may be used.

In this embodiment, although an IC card is exemplified as a memory card, the shape of the structure is not limited to a card-like shape, and the shape may be a rod- or block-like shape.

As has been described above, according to the present invention, in each IC card, the use of a data file correspond-ing to a specific application can be forcibly inhibited by command data externally input to the IC card. Therefore, when the application is to be performed, an enormous black list need not be referred to. One lower file belonging to an upper file or a set of a plurality of specific lower files in the hierachical structure can be selected as a target. Therefore, a file management apparatus capable of flexibly performing file management can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A file management apparatus comprising:

a memory having a plurality of files for storing data, each of the files including a plurality of areas;

first storage means for storing a plurality of file directories, each of the file directories including at least one of said files and having corresponding file position data, first lock data denoting a first locking condition of an accessing operation for each of the files, and second lock data denoting a second locking condition of an accessing operation for each of the plurality of areas within each file;

second storage means for storing a plurality of area definition data, each of the area definition data having corresponding area position data, and key data denoting an access condition for an area identified by the area definition data and area position data corresponding thereto;

first determination means for determining whether the accessing operation for a file to be accessed is inhibited by referring no the first lock data stored in the first storage means;

first accessing means for accessing the file to be accessed when it is determined by the first determination means that the accessing operation for the file to be accessed to is not inhibited;

second determination means for determining whether the accessing operation for areas to be accessed is inhibited by referring to the second lock data included in a file directory corresponding to a file to which the areas to be accessed depend on;

third determination means for determining whether the accessing operation for the area to be accessed is inhibited by referring to the key data included in an area definition data; and second accessing means for accessing to the area to be accessed when it is determined by the second and third determination means that the accessing operation for the area to be accessed is not inhibited.

2. The apparatus according to claim 1, wherein the first lock data has first data denoting a locking condition for an accessing operation for changing a file directory and second data denoting a locking condition for an accessing operation for reading the file directory; and wherein the first determination means include means for determining whether the accessing operation is inhibited based on one of the first and second data corresponding to a content of the accessing operation.

3. The apparatus according to claim 1, wherein said second lock data has third data denoting a locking condition for an accessing operation for changing data stored in an area and fourth data denoting a locking condition for an accessing operation for reading data in the area; and wherein said second determination means include means for determining whether the accessing operation is inhibited based on one of the third and fourth data corresponding to a content of the accessing operation.

4. The apparatus according to claim 1, said key data has fifth data denoting a locking condition for an accessing operation for changing data stored in an area and sixth data denoting a locking condition for an accessing operation for reading data in the area; and wherein said second determination means include means for determining whether the accessing operation is inhibited based on one of the fifth and sixth data corresponding to a content of the accessing operation.

5. A file management apparatus comprising:

a memory having a plurality of files for storing data;

key data storage means for storing file definition data corresponding to the plurality of files, each of the file definition data having key designating data for designating key data to be verified before an accessing operation for a corresponding file is performed, and a lock data denoting whether the accessing operation for the corresponding file is inhibited;

first determination means for determining whether the accessing operation for a file to be accessed is inhibited by referring to the lock data stored in the key data storage means;

second determination means for determining whether a verification of the key data designated by the key designating data stored in the key data storage means has been completed;

access inhibition means for inhibiting an accessing operation for a file to be accessed when it is determined by the first determination means that the accessing operation for the file is inhibited, and for inhibiting an accessing operation for a file to be accessed when it is determined by the first determination means that the accessing operation for the file is not inhibited and it is determined by the second determination means that the verification of the key data is not completed;

accessing means for accessing to the file to be accessed when it is determined by the first determination means that the accessing operation for the file is not inhibited and it is determined by the second determination means that the verification of the key data has been completed; and means for changing lock data stored in said key data storage means.

* * * * *